United States Patent

Welsch et al.

[11] Patent Number: 5,097,474
[45] Date of Patent: Mar. 17, 1992

[54] GAS LASER

[75] Inventors: Wolfgang Welsch, Baldham; Hans Krueger, Munich; Klemens Huebner, Ottobrunn; Rudolf Haeusler, Munich, all of Fed. Rep. of Germany

[73] Assignee: Siemens Aktiengesellschaft, Munich, Fed. Rep. of Germany

[21] Appl. No.: 668,987

[22] Filed: Mar. 13, 1991

Related U.S. Application Data

[62] Division of Ser. No. 564,739, Aug. 6, 1990.

[30] Foreign Application Priority Data

Sep. 27, 1989 [DE] Fed. Rep. of Germany ....... 3932256

[51] Int. Cl.[5] .............................................. H01S 3/03
[52] U.S. Cl. ....................................... 372/65; 445/28
[58] Field of Search ...................... 372/61, 65; 445/28

[56] References Cited

U.S. PATENT DOCUMENTS

| | | | |
|---|---|---|---|
| 3,739,297 | 6/1973 | Mark | 331/94.5 |
| 3,766,487 | 10/1973 | Roux | 331/94.5 PE |
| 3,784,927 | 1/1974 | Rudolph | 372/61 |
| 3,988,698 | 10/1976 | Crane et al. | 372/61 |
| 4,203,080 | 5/1980 | Wright et al. | 372/61 |
| 4,311,969 | 1/1982 | Kolb | 331/94.5 D |
| 4,644,554 | 2/1987 | Sheng | 372/61 |
| 4,644,555 | 2/1987 | Sheng | 372/65 |
| 4,799,232 | 1/1989 | Welsch | 372/61 |
| 4,823,356 | 4/1989 | Riley | 372/65 |

Primary Examiner—Leon Scott, Jr.
Attorney, Agent, or Firm—Hill, Van Santen, Steadman & Simpson

[57] ABSTRACT

In a gas laser having a capillary and a cathode that envelopes the capillary, a fastening of the cathode suitable for batch soldering is achieved in that the cathode is secured to an end piece having a mount for an optical element, and an end of the cathode facing away from the end piece is elastically supported against a housing wall with such a slight spring power that a weight of the unit formed of the cathode, end piece, and mount is adequate for overcoming the friction between the spring and the housing wall. Thus, the end piece with the attached cathode can slide into its final position during soldering solely on the basis of the force of gravity. The invention is particularly suited for helium-neon lasers that are manufactured in glass solder technology.

4 Claims, 1 Drawing Sheet

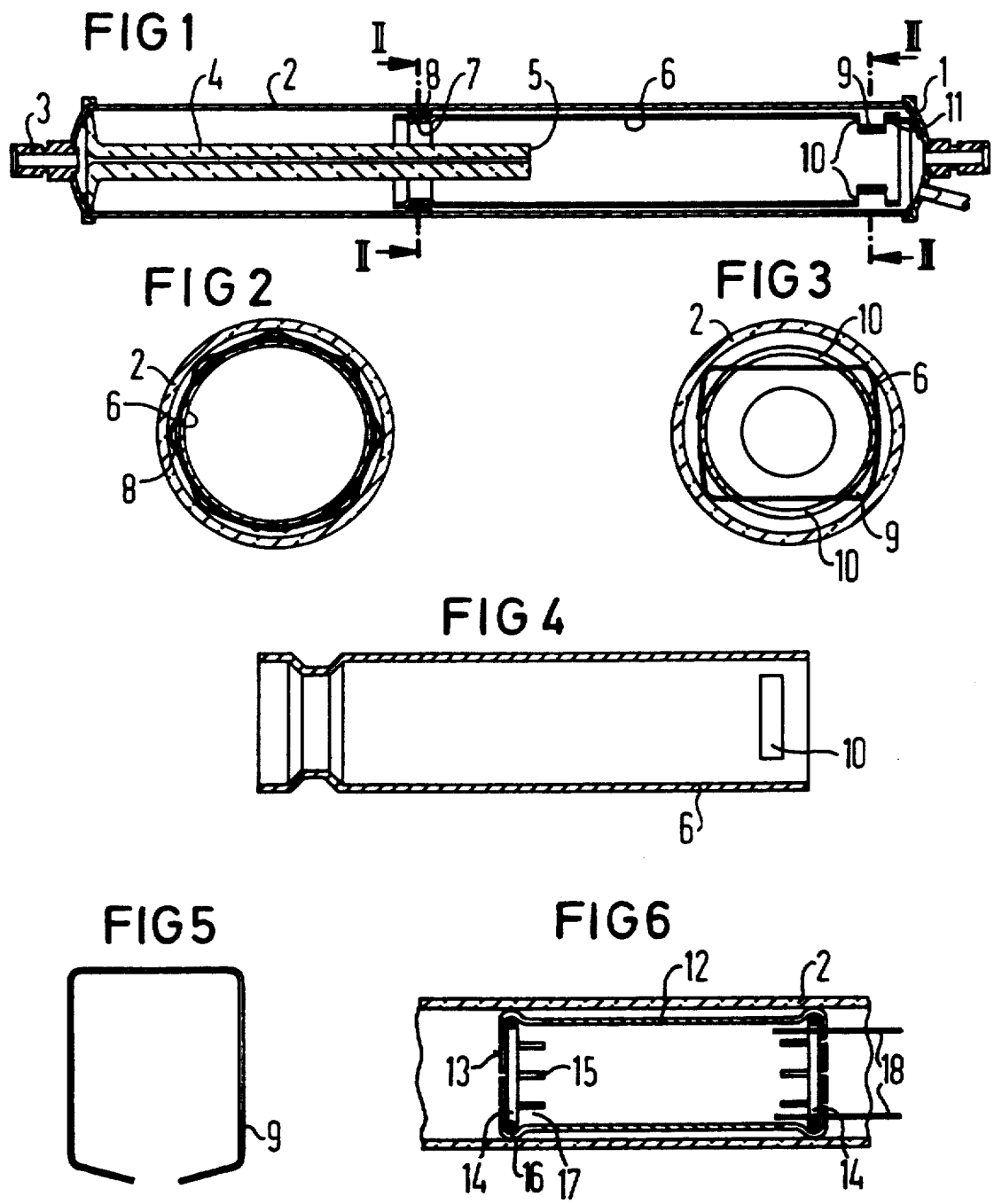

GAS LASER

This is a division of application Ser. No. 564,739, filed Aug. 6, 1990.

BACKGROUND OF THE INVENTION

The present invention is directed to a gas laser wherein a housing tube is provided having end pieces at ends thereof with mounts for optical elements. A capillary is provided which projects into the housing tube. A cylindrical cathode surrounds an end of the capillary. Such a gas laser is disclosed by U.S. Pat. No. 4,311,969, incorporated herein by reference. There, a termination that is carried at and fixed to a face plate of metal is applied to a cathode. For example, a nose that proceeds through a beam passage opening is applied to the electrode and this nose is plugged into the end plate and is riveted thereto in the fashion of a tube rivet. In this known embodiment, there is the risk that the heating required in the vacuum-tight closing of the housing leads to the deformation of the nose since the cathodes of lasers are usually formed of aluminum or of aluminum alloys, and the cathode nose is loosened as a result thereof. Thus, the electrical contact that is to be guaranteed via the same connection is interrupted at times, that is it can become an intermittent contact. This cathode fastening is fundamentally unsuited for manufacture in glass solder technology wherein an entire batch of tubes is simultaneously soldered in a furnace. The cathode already becomes soft at the temperature needed for the glass soldering; the fastening becomes unstable during the soldering (difference in expansion); the contacting is no longer faultlessly guaranteed; and the position in the housing tube is no longer faultlessly defined, so that a mechanical chattering during later operation must be feared. In an additional fastening of the electrode conforming to the above mentioned U.S. patent, a spring is provided at the open end of the cathode, this spring having spring arms pressing against the enveloping tube and against the capillary. A relatively high spring power must be exerted so that the spring is held in its axial position solely on the basis of the spring power. Furthermore, the spring power must suffice for centering the capillary that is generally formed of glass or of ceramic; and it must intercept mechanical vibrations of the capillary. For these reasons, the electrode must be shifted into its ultimate position before the housing is closed. This causes individual handling of the tubes; and a batch soldering is fundamentally impossible without further work in such a design.

SUMMARY OF THE INVENTION

An object on which the present invention is based, among others, is to provide a laser structure that is suitable for batch soldering in glass solder technology.

According to the invention, spring means is provided for supporting and centering an end of the cathode opposite the second end piece relative to wall of the housing. A spring power of the spring means is such that when the second end piece is drawn in a glass soldering process at the end of the housing tube, an intrinsic weight of the end piece with the attached cathode is sufficient to overcome a friction between the spring means and the housing wall so as to allow the end piece to be displaced axially relative to the housing tube axis during the glass soldering process.

In the cathode of the invention the spring is prevented from being displaced in an axial direction relative to the cathode due to the shaping of the cathode. This spring, however, is provided with such low spring power that, first it centers the cathode, but secondly, in view of a low friction relative to the housing wall, it is displaced or slides together with the cathode in an axial direction along the housing wall when the axis of the housing is arranged substantially vertically during glass soldering of the housing due to the weight of the cathode together with the end piece and the mirror mount. This enables batch soldering. When heating the tube to the soldering temperature and when a solder ring introduced in a standard way between the parts to be soldered softens, the end piece with the attached cathode thus sinks into its final position. Thus, an operation performed thereon from the outside is no longer required.

Insofar as a glass solder connection is to be produced only at the cathode side, the end piece can lie at the bottom in the soldering position so that the entire weight of the tube parts lying thereabove can be utilized for overcoming the friction. The prerequisite therefor is only that the pressure loadability of the electrode in the axial direction is also adequate for overcoming the friction at the soldering temperature.

An advantageous embodiment of the invention is that the cathode has slots in the proximity of its end facing away from the end piece. These slots are provided at at least two regions that lie opposite one another with reference to their rotational axis. A spring clip that presses against the housing wall is snapped into these slots. The spring clip is advantageously approximately rectangularly bent, and presses resiliently against the cathode and against the cathode tube between the two slots.

A further advantageous embodiment is that the cathode has a region deformed in a radial direction toward the symmetry axis in the proximity of its end face facing away from the end pieces. An undular or wave-shaped washer is introduced in this region. This embodiment is particularly suitable for relatively large cathode diameters since relatively great distances between the cathode and the housing tube can be bridged as a result thereof without difficulties. The deformed region is preferably designed as a bead or as an impressed groove. However, it can also have other shapes and, for example, can be interrupted in a circumferential direction so that a plurality of deformed regions arise. In this case, too, an undular washer can be placed therein which can, for example, press against the housing wall between the deformed regions.

The electrode is advantageously formed of aluminum or of an aluminum alloy, and comprises slots departing from the end face facing away from the end piece. These slots define a resilient end region. At least one deformation of the cathode that proceeds outwardly in a radial direction lies in this end region. An outwardly pressing spring is inserted into the deformation of the end region. This spring does not effect any deformation of the electrode in the cold condition but, at soldering temperature, presses at least some of the tongues of the cathode formed by the slots against the vessel wall. This embodiment guarantees the required low friction while the laser is being soldered together. The spring thus lies outside of the region of the plasma discharge, so that no sputtering need be feared. The deformation is advantageously a bead proceeding in a circumferential direction, whereby the spring can be an annular undular washer.

In a preferred embodiment, the end piece is a metal cap. The metal cap has guide edge that embraces the envelope of the housing tube and covers it by more than the enlargement of the expanse of the housing in the axial direction effected by the attachment of the solder ring before the soldering. A further advantageous embodiment has the features that the end piece is introduced into the housing tube, and comprises a part pressing against the end face of the housing tube. This end piece holds the solder ring before the soldering process and projects farther into the housing tube than an offset in the axial direction that is produced by the solder ring during the soldering process.

The invention enables the use of glass tubes as a housing tube that is not subject to any particular tolerance demands in view of its diameter. The spring design enables a faultless centering of the cathode, even given relatively large diameter tolerances.

BRIEF DESCRIPTION OF THE DRAWINGS

The invention shall now be set forth with reference to six figures is not limited to the examples shown in the figures.

FIG. 1 shows a laser of the invention in a sectional view;

FIGS. 2 and 3 show sections through such a gas laser having different resilient supports for the cathode;

FIG. 4 shows a cathode according to the example of FIG. 3 in a section view;

FIG. 5 shows a spring for use in the gas laser assembly; and

FIG. 6 shows an example of a further cathode supported at both sides.

DESCRIPTION OF THE PREFERRED EMBODIMENTS

End pieces 1 designed as metal caps are soldered to a housing tube 2 to form a laser housing. Mounts 3 for optical elements, particularly for mirrors, are attached to the end pieces 1. A capillary 4 extends from an end of the laser at the anode side into the housing tube 2. The end 5 of the capillary 4 facing away from the anode is surrounded by the cathode 6. In an axial direction toward the end 5 of the capillary 4, the cathode 6 has a region 7 deformed in a radial direction toward a symmetry axis. An undular or wave-shaped washer 8 that supports and centers the cathode 6 relative to the housing tube 2 lies in this region 7.

In the proximity of the metal cap at the cathode side the cathode 6 comprises two slots 10 that cover only a part of the circumference thereof and lie opposite one another with reference to the rotational axis of the cathode. A metal spring 9 is snapped into the slots 10, this metal spring 9 pressing resiliently against the cathode 6 and against the housing tube 2 between the two slots 10, thus fixing the cathode 6 in a radial direction relative to the housing tube 2. A contact band 11 produces an electrical contact between the metal cap and the cathode 6 and simultaneously supports the cathode in an axial direction.

Some differently shaped end pieces, for example an end piece of sintered glass that is inserted into the housing tube 2 with a quide cylinder, can be employed instead of the metal cap i. Such end pieces are disclosed by U.S. Pat. No. 4,799,232, incorporated herein by reference.

The examples have shown cathode shapes supported against the housing wall at both sides. Given an adequate fixing of the radial position in the region of the metal cap of the cathode side by, for example, the power lead, the support against the housing wall lying closest to this metal cap can be omitted.

A further advantageous and uninvolved cathode shape is shown in FIG. 6. A cathode 12 that already has a reduced shape stability at the soldering temperature and that is preferably formed of aluminum or of aluminum alloys is outwardly expanded at least in the region of its end face 13 facing toward the anode. In the illustrated example, however, it is outwardly expanded in the radial direction at both sides. A spring ring 14 is introduced into this widened portion and is fixed in the axial direction relative to the cathode. In the illustrated example, the fixing occurs on the basis of an appropriate shaping of the cathode. Slots 15 extend from the end face to beyond the spring ring 14 and into the cathode 12. They form clips 17 that embrace the widened portions 16. In the cold condition, the spring power of the spring ring 14 is not adequate to bend the clips 17 to a noteworthy degree. During soldering, however, when the spring power of the cathode material decreases, the spring ring 14 presses the clips 17 outward and thus manages the required, resilient pressing of the cathode 12 against the housing wall. Even in the hot condition, the deformations 16 are adequate for the axial fixing of the spring ring 14. The spring power of the spring ring 14 is dimensioned such that, even given the insertion of two spring rings as shown in the present example, the weight of the end piece and of the tube parts connected thereto can push the cathode 12 into the housing tube. For example, the cathode is joined to the end piece via two or more connecting clips 18. The end piece is not shown.

Although various minor changes and modifications might be proposed by those skilled in the art, it will be understood that we wish to include within the claims of the patent warranted hereon all such changes and modifications as reasonably come within our contribution to the art.

We claim as our invention:

1. A method for constructing a gas laser tube structure, comprising:
    providing a housing tube;
    providing first and second end pieces at ends of the housing tube;
    providing a capillary within the housing tube near the first end piece;
    attaching one end of a cathode to the first end piece and positioning the cathode in the housing tube;
    providing a spring arrangement for supporting an end of the cathode opposite said one end within the housing tube relative to an inner wall of the housing tube, said spring having a low spring pressure chosen so as to permit the cathode with its attached first end piece to slide axially along the housing tube under influence of a weight to the cathode and end piece when the housing tube is arranged substantially vertically; and
    in a soldering process arranging the housing tube substantially vertically, and then soldering the first end piece at an end face of the housing tube, said cathode being laterally displaced along the axis of the housing tube during the soldering process.

2. A method according to claim 1 including the step of providing an indented region around said end of said cathode and in said indented region providing a wave-shaped spring arrangement around the periphery thereof.

3. A method according to claim 1 including the step of providing at said end of said cathode a plurality of slots and an expansion spring on an inside of the cathode to expand an outer periphery of the cathode at said end so as to contact an inner wall of the housing.

4. A method for constructing a gas laser tube structure, comprising:

providing a housing tube;

providing first and second end pieces at ends of the housing tube;

attaching one end of a cathode to the first end piece and positioning the cathode in the housing tube;

providing a spring attachment for supporting an end of the cathode opposite said one end within the housing tube relative to an inner wall of the housing tube, said spring permitting the cathode with its attached first end piece to slide axially along the housing tube under influence of a weight of the cathode and end piece when the housing tube is arranged in its soldering position during a soldering process for the first end piece; and in a soldering process arranging the housing tube substantially vertically, and then soldering the first end piece at an end face of the housing tube, said cathode being laterally displaced along the axis of the housing tube during the soldering process.

* * * * *